Dec. 4, 1951  O. A. CORL, JR., ET AL  2,577,002
FLEXIBLE HITCH

Filed Dec. 16, 1947  2 SHEETS—SHEET 1

Inventors
Oliver A. Corl, Jr. &
Vernon Nelson
By L. B. James
Attorney

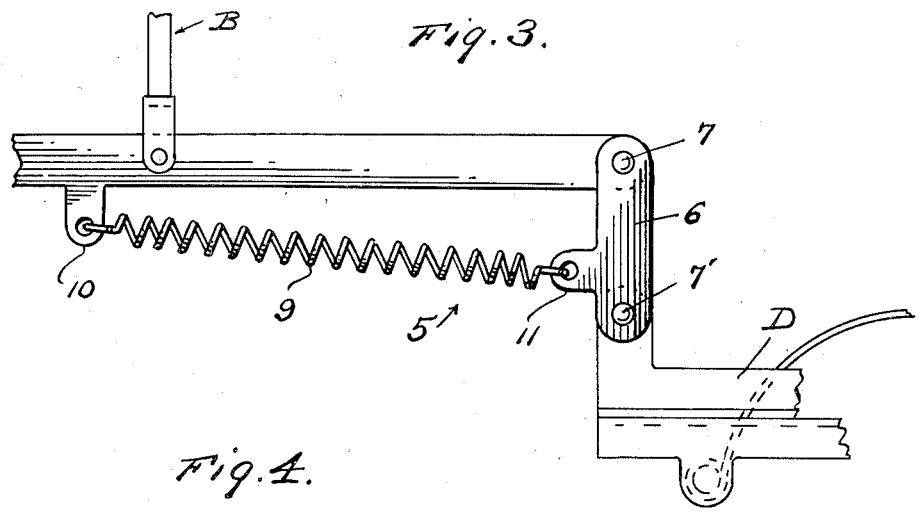
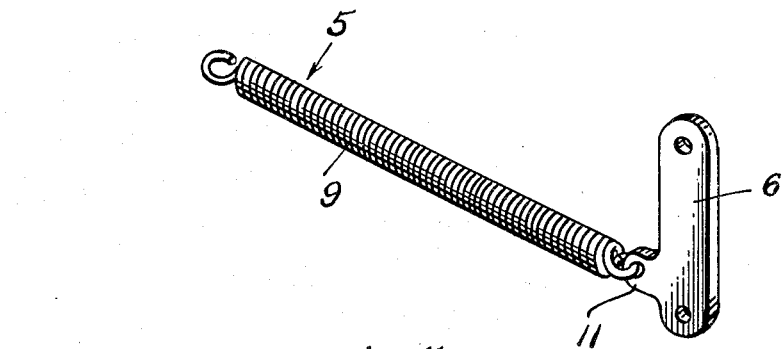
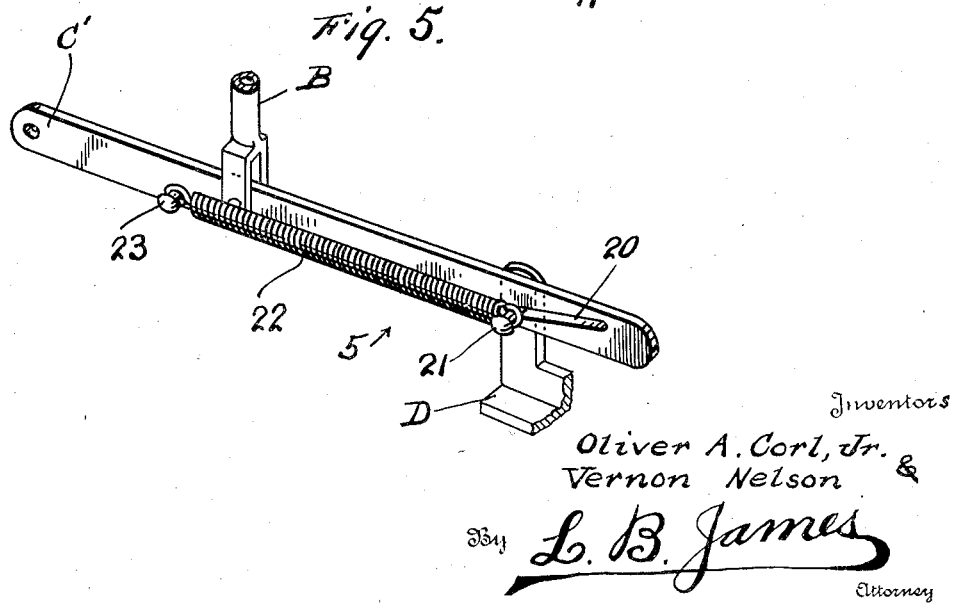

UNITED STATES PATENT OFFICE 2,577,002

FLEXIBLE HITCH

Oliver A. Corl, Jr., and Vernon Nelson, Fillmore, Calif., assignors to Corl and Fleming, Fillmore, Calif., a copartnership Application December 16, 1947, Serial No. 792,068

2 Claims. (Cl. 97—47)

This invention relates to the official class of draft-bars and more particularly flexible draft-bars.

One of the objects of this invention resides in the combination of a mechanical or hydraulic lift mechanism adapted to connect a farm implement or other vehicle to a tractor so as to provide flexible and balanced pull of the tractor on the implement.

Another object of this invention resides in the provision of a flexible hitch connecting a tractor to a drawn implement, vehicle or the like so as to overcome undue strain on the tractor when starting or upon the implement encountering obstructions while working on the ground.

A further object of this invention resides in the provision of a flexible hitch connecting a tractor to a plow, cultivator or the like so as to direct it toward the surface of the ground when encountering obstructions in the path of the ground working blades thereof.

A still further object of this invention resides in the provision of a flexible hitch connecting a tractor to a plow, cultivator or the like adapted to ease the pull on the tractor when making a turn.

Aside from the aforesaid objects this invention resides in the provision of means whereby the pull on a tractor drawing a ground working farm implement while in operation or a loaded vehicle will be cushioned when started.

With these and other objects in view, this invention resides in certain novel features of construction and arrangement of elements of be hereinafter more particularly set forth in the specification, illustrated in the drawings and pointed out in the appended claims and, although this disclosure depicts our present conception of the invention, the right is reserved to resort to such departures therefrom as come within the scope of the claims.

In the accompanying drawing forming a part of this application:

Fig. 3 is an enlarged side view of a portion of the hydraulic lift with the flexible hitch secured thereto.

Fig. 4 is a perspective view of the hitch.

Fig. 5 is a perspective view of a modified form of the hitch.

Figure 1:
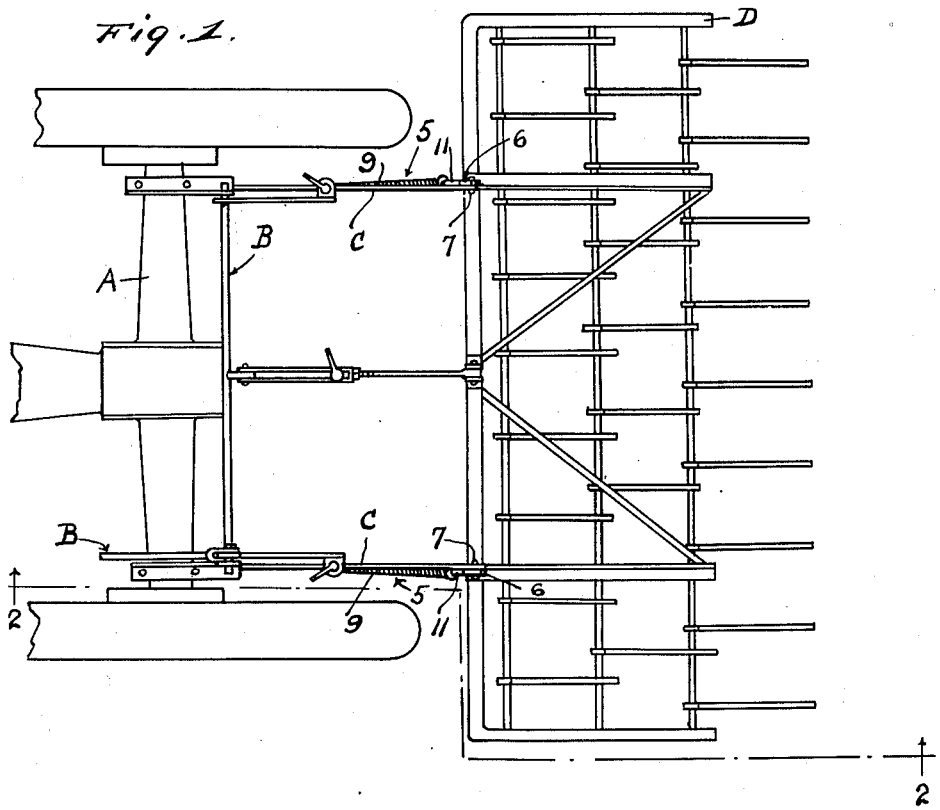
Fig. 1 is a plan view of the rear portion of a tractor with the front portion of a cultivator connected thereto by the flexible hitch.
Figure 2:
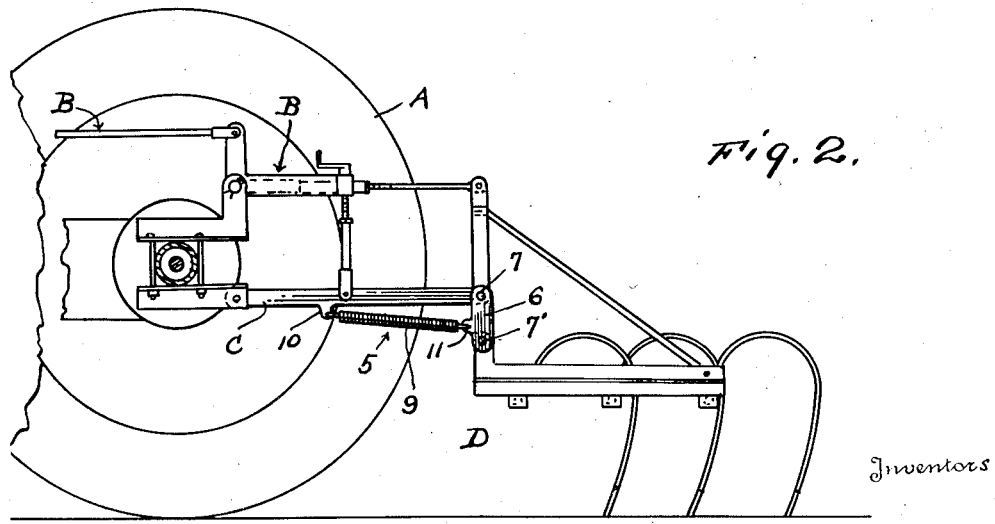
Fig. 2 is a side view thereof.

In the embodiment of this invention the letter A designates the rear portion of a tractor having a conventional hydraulic lift B secured thereto and although the flexible hitches 5 forming the subject matter of this invention are herein shown as secured to the rearwardly extending depth regulating beams C on opposite sides of the tractor for connection to the forward opposite side portions of a cultivator D, plow or other ground working farm implement, it is within the purview of this invention to employ the hitches wherein the similar functions may be practiced. Further, a single hitch may be attached to a tractor draw-bar to carry out certain functions performed by the dual assembly heretofore set forth.

The flexible hitches 5 consist of links 6 pivoted at their upper ends to the rear ends of the beams C as indicated by the numeral 7 with their lower ends pivoted to opposite front portions of the cultivator as indicated by the numeral 7' and in order to retain them in rectractile position under even and smooth pull on the cultivator and to permit them to yieldingly function to automatically raise the cultivator blades from a predetermined depth in the ground when undue strain thereon is placed on the tractor and thereafter return them to their predetermined set positions in the ground, retractile coil springs 9 connect the links to the beams through the instrumentality of opposed lugs 10 and 11, the former of which is formed on the links while the latter are formed on the beams.

In the modified form of the hitch as shown in Fig. 5 of the drawings, beams C', somewhat similar to beams C, are provided with rearwardly and upwardly directed slots 20 through which extend fasteners 21 pivotally connecting standards 21' rigidly secured to opposite forward portions of the cultivator to the beam and, in order to retain the fasteners at the lower forward ends of the slots, retractile coil springs 22 have their forward ends secured to studs 23 on the beams C' and their opposite ends secured to the pivotal fasteners 21. Through the instrumentality of the aforesaid elements, the pivotal fasteners 21 securing the forward portions of a cultivator to the beam C' will function similarly to the preferred form of the hitch.

With this invention fully set forth, it is manifest that a flexible hitch is provided whereby smooth and balanced pull on a trailing vehicle attached to a pulling vehicle is not only procured, but outside resistance of trailing ground working implements is reduced while the lead vehicle is making turns in a field.

Having thus described our invention, what we claim and desire to protect by Letters Patent is:

1. The combination with a tractor having an implement lift thereon, a trailing ground working implement, beams having rearwardly and upwardly directed slots adjacent their outer ends pivotally connected at their inner ends to the tractor, pivotal pins secured to opposite sides of the ground working implement at points above its frame with their outer ends extending through the slots in the aforesaid beams, studs secured to the beams at points forwardly of said pivotal pins, and retractile coil springs connecting the aforesaid studs and pivotal pins and yieldingly retaining the pivotal pins in normal position at the lower ends of said slots in the beams.

2. The combination with a tractor having an implement lift thereon, a trailing ground working implement having standards rigidly secured to opposite sides of its forward end, elongated straight beams pivotally secured at their forward ends to the tractor and having diagonal slots in their rear ends directed rearwardly and upwardly, pivotal pins secured to the upper ends of the aforesaid standards and extending through the slots in said beams, studs secured to the beams forwardly of said slots therein, and retractile coil springs having their rear ends looped around the outer ends of said pivotal pins to secure the beam thereon and their forward ends looped around said studs to normally retain the pivotal pins at the lower ends of the slot in the beam.

OLIVER A. CORL, Jr.
VERNON NELSON.

REFERENCES CITED

The following references are of record in the file of this patent:

FOREIGN PATENTS

| Number | Country | Date |
|---|---|---|
| 100,793 | Great Britain | Oct. 26, 1916 |
| 553,835 | Great Britain | June 8, 1943 |
| 556,859 | Great Britain | Oct. 26, 1943 |